(12) United States Patent
Ando et al.

(10) Patent No.: US 8,977,539 B2
(45) Date of Patent: Mar. 10, 2015

(54) LANGUAGE ANALYSIS APPARATUS, LANGUAGE ANALYSIS METHOD, AND LANGUAGE ANALYSIS PROGRAM

(75) Inventors: Shinichi Ando, Tokyo (JP); Kunihiko Sadamasa, Tokyo (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 13/256,697

(22) PCT Filed: Mar. 23, 2010

(86) PCT No.: PCT/JP2010/054920
§ 371 (c)(1),
(2), (4) Date: Sep. 15, 2011

(87) PCT Pub. No.: WO2010/113691
PCT Pub. Date: Oct. 7, 2010

(65) Prior Publication Data
US 2012/0016664 A1      Jan. 19, 2012

(30) Foreign Application Priority Data

Mar. 30, 2009   (JP) .................................. 2009-081431

(51) Int. Cl.
*G06F 17/27* (2006.01)

(52) U.S. Cl.
USPC ................................ 704/9; 704/257; 704/254

(58) Field of Classification Search
USPC ............... 704/1–10, 251, 255, 250, 270, 254, 704/257; 386/95
See application file for complete search history.

(56) References Cited

U.S. PATENT DOCUMENTS

| | | | | |
|---|---|---|---|---|
| 5,029,084 A | * | 7/1991 | Morohasi et al. | 704/9 |
| 6,651,039 B1 | * | 11/2003 | Ikuta et al. | 704/4 |
| 2010/0111498 A1 | * | 5/2010 | Weda et al. | 386/95 |

FOREIGN PATENT DOCUMENTS

| | | |
|---|---|---|
| CN | 1928854 A | 3/2007 |
| CN | 101206643 A | 6/2008 |

(Continued)

OTHER PUBLICATIONS

International Search Report for PCT/JP2010/054920 mailed Jun. 8, 2010.

(Continued)

*Primary Examiner* — Huyen X. Vo
(74) *Attorney, Agent, or Firm* — Sughrue Mion, PLLC (57) ABSTRACT

A language analysis apparatus of the invention includes division rules, each of which is classified into one of levels according to the degree of risk of causing analysis accuracy problems when applied; a division point candidate generation unit 21 which, when a character string whose length is greater than the predetermined maximum input length is input, generates division point candidates for the input character string by applying the division rules sequentially one by one in the ascending order of the level of risk of causing problems; a division point adjustment unit 22 which, when the length of a division unit candidate obtained by the division point candidate generated by the division point candidate generation unit 21 is less than the maximum input length, selects a combination of division points from among the division point candidates obtained by applying division rules of the same level while ensuring that each division unit is not greater in length than the maximum input length; and a division unit 23 which divides an input character string at the division point determined by the division point adjustment unit.

15 Claims, 5 Drawing Sheets

(56) References Cited

FOREIGN PATENT DOCUMENTS

| | | |
|---|---|---|
| EP | 0 469 884 A2 | 7/1991 |
| JP | 61-255468 A | 11/1986 |
| JP | 5-12329 A | 1/1993 |
| JP | 8-190563 A | 7/1996 |
| JP | 8-235180 A | 9/1996 |
| JP | 3173514 B | 6/2001 |
| JP | 2002117019 A | 4/2002 |
| JP | 2005284723 A | 10/2005 |

OTHER PUBLICATIONS

Chinese Office Action for CN Application No. 201080014350.3 Issued on Apr. 21, 2014 with English Translation.

* cited by examiner

| LEVEL | DIVISION POINT IDENTIFICATION PATTERN | DIVISION POINT |
|---|---|---|
| 1 | PERIOD "。" | IMMEDIATELY AFTER PATTERN |
| 2 | CONJUNCTIVE PARTICLE "が" + COMMA "、" | IMMEDIATELY AFTER PATTERN |
| | CONJUNCTIVE PARTICLE "ので" + COMMA "、" | IMMEDIATELY AFTER PATTERN |
| 3 | CONJUNCTIVE PARTICLE "て" + COMMA "、" | IMMEDIATELY AFTER PATTERN |
| | CONTINUATIVE FORM VERB + COMMA "、" | IMMEDIATELY AFTER PATTERN |
| 4 | CLAUSE | IMMEDIATELY AFTER PATTERN |

LANGUAGE ANALYSIS APPARATUS, LANGUAGE ANALYSIS METHOD, AND LANGUAGE ANALYSIS PROGRAM

TECHNICAL FIELD

The present invention relates to a method of performing language analysis by parsing of natural language. More particularly, the invention relates to a language analysis apparatus, a language analysis method, and a language analysis program which perform a language analysis process efficiently while dividing long sentences into shorter ones.

BACKGROUND ART

Language analysis by parsing is typically performed by first dividing an input character string into sentences and then subjecting each of these sentences to an analysis process. However, when analyzing a very long sentence as one often seen in specifications for patent applications, a simple analysis process on a sentence-by-sentence basis may encounter some problems.

A language analysis apparatus, such as one for parsing, typically performs an analysis process by dividing an input character string into sentences and then examining the relationship between each of pairs of the words contained in each sentence. This means that the number of word pairs to be considered increases exponentially with an increase in the length of the input sentence.

If a very long sentence is to be analyzed, an enormous amount of word pairs must be computed. This should lead to various problems, including long analysis time and a large amount of memory capacity required for analysis.

Furthermore, the number of possible interpretations increases with an increase in the number of word pairs to be considered. This in turn increases the potential for analysis errors. To avoid this, there have been proposed various methods of dividing an input sentence, if it is too long, before performing an analysis process.

For example, in Patent Literature 1, a method is disclosed in which, if a machine translation process takes longer than the predetermined time, the previously given dividing rule is applied to divide the input sentence into smaller units and performs the machine translation process on each unit.

The method proposed in Patent Literature 2 stores division rules in association with adaptive word counts and applies division rules sequentially in the descending order of adaptive word counts so as to enable the input sentence to be divided into more appropriate units.

Patent Literature 1: Japanese Patent Laying-Open No. 61-255468

Patent Literature 2: Patent No. 003173514

The problems with the aforementioned methods of dividing input sentences for language analysis by parsing will be described below.

The first problem is that, when a maximum length of input (hereinafter, "maximum input length") acceptable in an analysis process is given, a long sentence cannot be divided into processing units of an appropriate length according to such maximum length of input.

Division rules are roughly categorized into two types. One type of division rule focuses on linguistic expressions that provide relatively broad breaks, while the other pays attention to those that provide relatively fine breaks. Generally speaking, a division rule of the former type allows analysis to be made correctly, even if an analysis process is performed on each division unit as is, without any adjustments after dividing the sentence at the division point obtained by applying the division rule. However, this rule focuses on relatively rare specific linguistic expressions. This is problematic because a division points may not necessarily be obtained from all input sentences and, when they are actually obtained, each of the resulting division units may not be sufficiently short.

The latter type of division rule, on the other hand, obtains division points by focusing on linguistic expressions that are relatively frequently used. Therefore, a division rule of this type allows division points to be obtained from a relatively large number of sentences. In addition, the resulting division units are likely to be sufficiently short. On the other hand, this raises a problem in that analysis accuracy often decreases because individual division units may become too short to allow correct analysis of each division unit.

The division method disclosed in Patent Literature 2 attempts to resolve the problems described above by storing division rules in association with adaptive word counts and applying division rules sequentially in the descending order of the adaptive word counts. This method, however, also suffers a problem of decreased analysis accuracy. One reason for this is the difficulty in setting appropriate an adaptive word count for a division rule. Another is that, when a stage is reached where a division rule with a smaller adaptive word count needs to be applied, the resultant division units become too short to ensure correct analysis.

OBJECT OF THE INVENTION

An object of the present invention is to provide a language analysis apparatus and a language analysis method which can divide a long sentence into processing units of an appropriate length according to the maximum input length acceptable in an analysis process.

SUMMARY

According to a first exemplary aspect of the invention, a language analysis apparatus, includes division rules, each of which is classified into one of levels according to the degree of risk of causing analysis accuracy problems when applied, a division point candidate generation unit which, when a character string whose length is greater than the predetermined maximum input length is input, generates division point candidates for the input character string by applying the division rules sequentially one by one in the ascending order of the level of risk of causing problems, a division point adjustment unit which, when the length of a division unit candidate obtained by dividing the character string at the division point candidate generated by the division point candidate generation unit is less than the maximum input length, selects a combination of division points from among the division point candidates obtained by applying division rules of the same level while ensuring that each division unit is not greater in length than the maximum input length, and a division unit which divides an input character string at the division point determined by the division point adjustment unit.

According to a second exemplary aspect of the invention, a language analysis method, includes a division point candidate generation step of, when a character string whose length is greater than the predetermined maximum input length is input, generating division point candidates for the input character string by applying the division rules, each of which has been classified into a level according to the degree of risk of causing analysis accuracy problems when applied, sequentially one by one in the ascending order of the level of risk of causing problems, a division point adjustment step of, when the length of a division unit candidate obtained by dividing the character string at the division point candidate generated in the division point candidate generation step is less than the maximum input length, selecting a combination of division points from among the division point candidates obtained by applying division rules of the same level while ensuring that each division unit is not greater in length than the maximum input length, and a division step which divides an input character string at the division point determined by the division point adjustment step.

According to a third exemplary aspect of the invention, a language analysis program which performs a language analysis process by running on a computer, causing a computer to perform a division point candidate generation process which, when a character string whose length is greater than the predetermined maximum input length is input, generates division point candidates for the input character string by applying division rules, each of which has been classified into a level according to the degree of risk of causing analysis accuracy problems when applied, sequentially one by one in the ascending order of the level of risk of causing problems, a division point adjustment process which, when the length of a division unit candidate obtained by dividing the character string at the division point candidate generated by the division point candidate generation process is less than the maximum input length, selects a combination of division points from among the division point candidates obtained by applying division rules of the same level while ensuring that each division unit is not greater in length than the maximum input length, and a division process which divides an input character string at the division point determined by the division point adjustment process.

According to the invention, if a maximum input length acceptable in an analysis process is set, it is possible to divide a long sentence into processing units of an appropriate length according to such maximum length of input.

This is because division rules, each of which has been classified into a level according to the degree of risk of causing analysis accuracy problems, are applied sequentially, and each of the resultant division points is adjusted so that each division unit will have the greatest possible length but will not exceed the maximum input length.

EXEMPLARY EMBODIMENT

First Exemplary Embodiment

A first exemplary embodiment of the present invention will now be described in detail with reference to the drawings.

Figure 1:
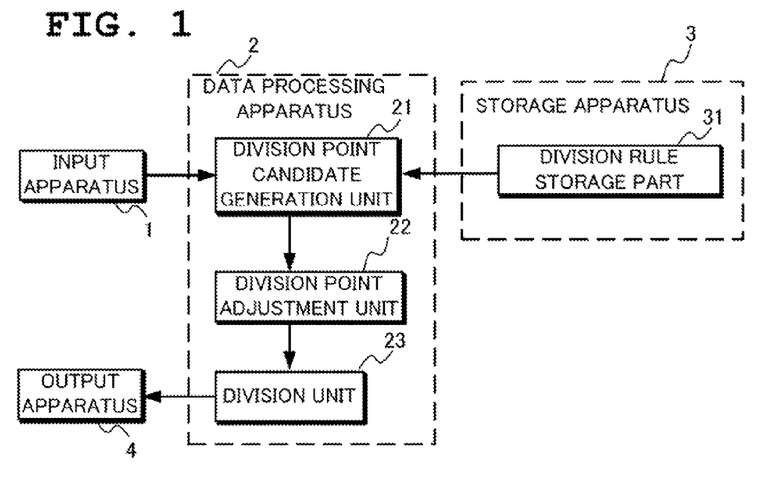
FIG. 1 is a block diagram showing the structure of a language analysis apparatus according to a first exemplary embodiment of the present invention.

With reference to FIG. 1, it can be seen that the language analysis apparatus according to the first exemplary embodiment of the present invention includes an input apparatus 1, such as a keyboard or a mouse, a data processing apparatus 2, which operates under control of program instructions, a storage apparatus 3, which stores information, and an output apparatus 4, such as a display apparatus and a print apparatus.

The storage apparatus 3 is provided with a division rule storage part 31. The division rule storage part 31 stores division rules to be applied to input character strings to identify points in the input character string that can possibly serve as division points.

The division rule storage part 31 stores division rules after grouping them into at least two levels according to the degree of risk of causing analysis accuracy problems when applied.

The grouping of a division rule into a level is performed, for example, as follows. First, the result of performing language analysis on each of the division units obtained by applying the division rule is compared with the result of performing language analysis without dividing the input character string. If the comparison implies that division will cause substantially no change in the analysis result corresponding to each division unit, the division rule is regarded as "no risk" and classified into "high level." If the comparison implies a low possibility for division to cause changes in such analysis result, the division rule is regarded as "low risk" and classified into "medium level." If the comparison implies a high possibility for division to cause changes in such analysis result, the division rule is regarded as "high risk" and classified into "low level."

The data processing apparatus 2 includes a division point candidate generation unit 21, a division point adjustment unit 22, and a division unit 23.

If the character string input as the target of processing is greater in length than the predetermined maximum input length, the division point candidate generation unit 21 reads out a division rule from those stored in the division rule storage part 31 in the ascending order of risk, and generates division point candidates within the input character string by applying the read-out division rule.

The term "division point candidate" herein means a point identified in an input character string that can possibly serve as a division point. The term "maximum input length" means the acceptable maximum length of an input character string. A maximum input length is a value determined according to the time of processing required and the acceptable memory consumption for language analysis. This value can be defined based on, for example, the number of characters or morphemes contained in the input character string.

The division point adjustment unit 22 receives the division point candidates generated by the division point candidate generation unit 21. It checks, sequentially one by one, the division unit candidates that can be obtained by dividing the input character string at each of the division point candidates, and determines whether or not it will use the division point candidate as a division point.

The division point adjustment unit 22 decides on a division point by selecting division point candidates as necessary in order to ensure that a total of all individual division units ultimately obtained will be equal to or less than the maximum input length.

The division unit 23 receives the division point determined by the division point adjustment unit 22 and generates division units by dividing the input character string at the division point.

Operation of the Exemplary Embodiments

Figure 2:
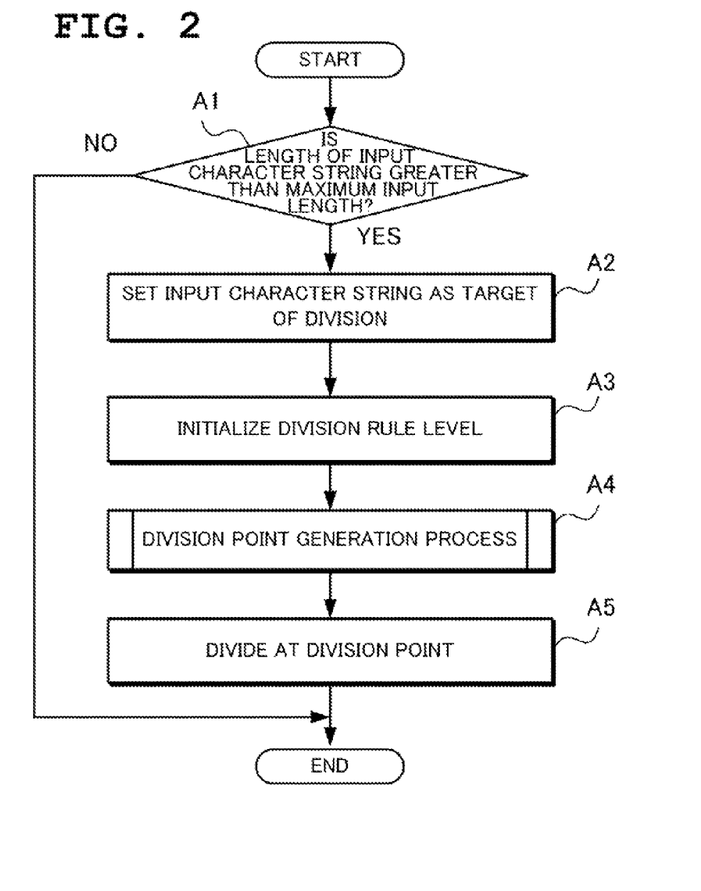
FIG. 2 is a flow chart showing the operation of the language analysis apparatus according to the first exemplary embodiment of the present invention.

Next, the operation of the present exemplary embodiment will be described in detail with reference to the flow charts of FIGS. 1 and 2.

Upon receipt of an input character string from the input apparatus 1, the division point candidate generation unit 21 of the data processing apparatus 2 first calculates the length of the input character string. It then compares the calculated length with the previously given maximum input length to determine whether or not the input character string is greater in length than the maximum input length (step A1). It should be noted here that, although an input from the input apparatus 1 can be a simple character string, the input more preferably contains the morphemes that constitute the input character string and the attribute information, e.g. root forms and parts of speech, of these morphemes.

If, in step A1, the length of an input character string is equal to or less than the maximum input length, there is no need to divide the character string, so the division point candidate generation unit 21 ends the entire process.

If the length of an input character string is greater than the maximum input length, it sets the input character string as the target of division (step A2).

Next, the division point candidate generation unit 21 initializes the division rule level and sets it to the level with the lowest risk, i.e. "high level" (step A3).

In step A4, the division point candidate generation unit 21 starts a division point generation process, using a division rule of the level set in step A3 above, on the character string set as the target of division in step A2 above. The division point generation process will be described below.

The division unit 23 divides the character string which is the target of division, based on the division point obtained through the division point generation process performed by the division point candidate generation unit 21 (step A5).

With reference to the flow chart of FIG. 3, the division point generation process performed by the division point candidate generation unit 21 and the division point adjustment unit 22 will now be described in detail.

The division point candidate generation unit 21 obtains the division rule of the set level from the division rule storage part 31 and generates a division point candidate by applying the obtained division rule to the character string set as the target of division (step B1).

If no division point candidate has been obtained from the target of division by applying the division rule, the division point candidate generation unit 21 lowers the division rule level by one (steps B2 and step B3) and attempts again to generate a division point candidate by applying the division rule of the new level. More specifically, the unit generates a division point candidate by using the division rule whose risk level is lower by one (i.e. whose risk is greater than that of the initial one).

If the division rule level cannot be lowered any more (not shown in FIG. 3), the division point generation process will be ended.

Figure 3:
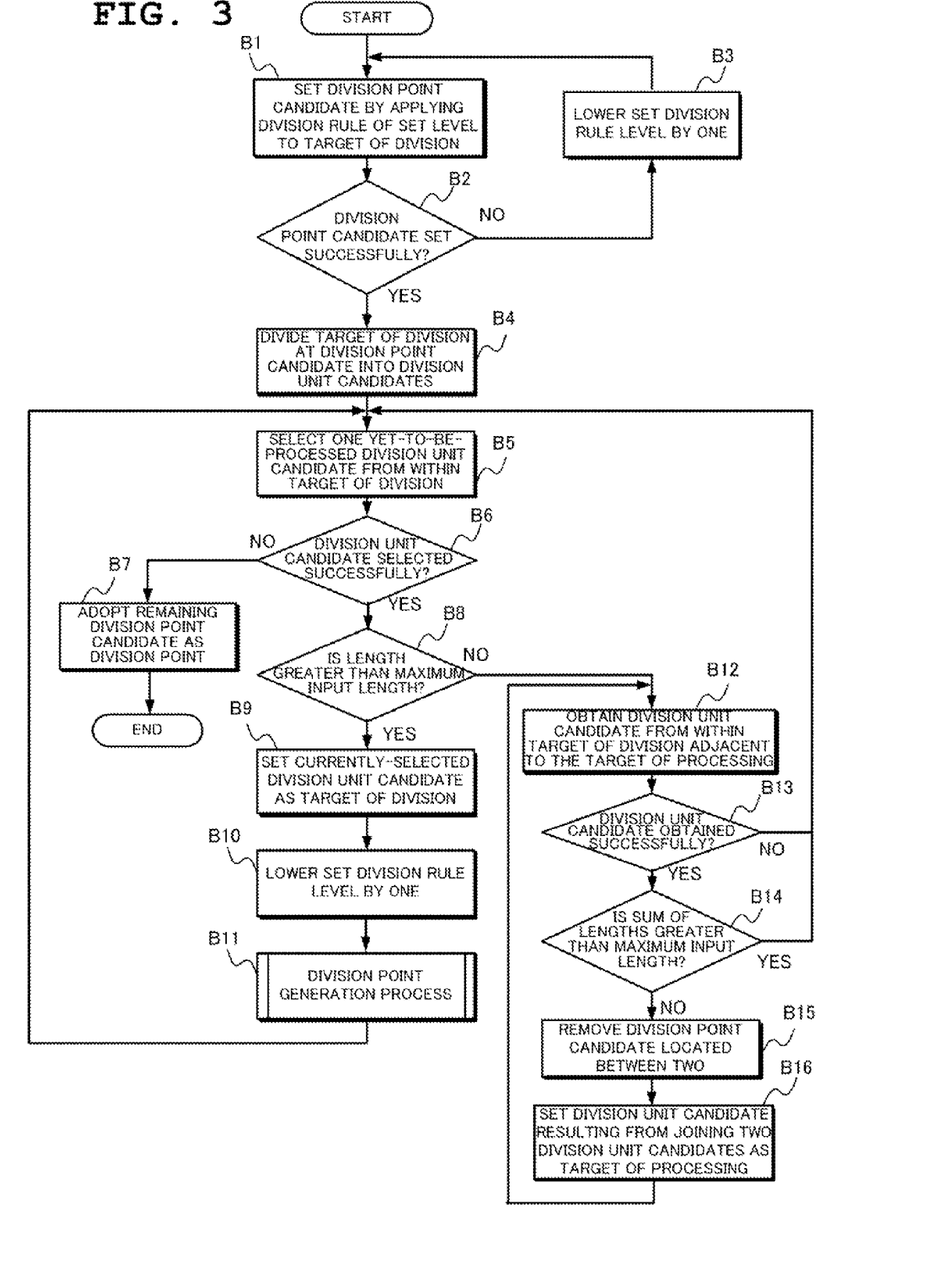
FIG. 3 is a flow chart showing the operation of the language analysis apparatus according to the first exemplary embodiment of the present invention.

If a division point candidate has been set in step B1 in FIG. 3, the division point candidate generation 21 passes the set division point candidate to the division point adjustment unit 22.

Upon receipt of the division point candidate set by the division point candidate generation unit 21, the division point adjustment unit 22 divides the input character string into the division unit candidates at the division point candidate (step B4).

The division point adjustment unit 22 then selects one division unit candidate yet to be checked, from within the obtained division unit candidates (step B5).

One example of method of selecting a division unit candidate may be to begin the selection with the one nearest to the head of the character string, within all the division unit candidates that have been obtained from the current target of division and that still remain yet to be checked, and move on sequentially. Conversely, the selection may begin with the one located the nearest to the end of the character string among all the division unit candidates yet to be checked. Another alternative method is to select one from all the division unit candidates yet to be checked in the increasing order of length.

Next in step B6, the division point adjustment unit 22 verifies whether or not a division unit candidate yet to be checked has been selected successfully in step B5.

If a division unit candidate yet to be checked was unable to be selected in B5, it means that the checking process has been completed with all the division unit candidates. In this case, the division point adjustment unit 22 adopts as the division point a division point candidate that is left unremoved, outputs the obtained division point, and ends the process (step B7).

If it was verified in step B6 that a division unit candidate yet to be checked was able to be selected, the division point adjustment unit 22 calculates the length of the selected division unit candidate, and compares the calculated length with the predetermined maximum input length to determine whether or not the length of the division unit candidate is greater than the maximum input length (step B8).

If the comparison in step B8 indicates that the length of the selected division unit candidate is greater than the maximum input length, the division point adjustment unit 22 sets this division unit candidate as a new target of division (step B9) and lowers the division rule level by one (step B10).

Next, the division point adjustment unit 22 passes the process to the division point candidate generation unit 21, which in turn generates a division point candidate for the division unit candidate by using the new-level division rule (step B11).

When the process is returned from the division point candidate generation unit 21, the division point adjustment unit 22 goes back to step B5 and resumes the process.

If in step B8 the length of the selected division unit candidate has been determined to be less than the maximum input length, the division point adjustment unit 22 obtains a new division unit candidate that is adjacent to the selected division unit candidate from within the current target of division (step B12).

The division point adjustment unit 22 then verifies whether or not the adjacent division unit candidate was able to be obtained successfully (step B13) and, if not, returns to step B5 and resumes the process.

If the adjacent division unit candidate was able to be obtained, the division point adjustment unit 22 calculates a sum of the length of the selected division unit candidate and the length of the obtained adjacent division unit candidate. It then compares the resultant length with the predetermined maximum input length to determine whether or not the sum of the lengths is greater than the maximum input length (step B14).

If in step B14 the calculated sum of the lengths has been determined to be greater than the maximum input length, the division point adjustment unit 22 establishes the currently-selected division unit candidate as "checked" and returns to step B5 to resume the process.

If in step B14 the calculated sum of the length has been determined to be less than the maximum input length, the division point adjustment unit 22 removes the division point candidate located between the selected division unit candidate and the obtained adjacent division unit candidate (step B15). The division point adjustment unit 22 then sets as the new target of processing a division unit obtained by joining two division unit candidates, i.e. the selected and the obtained adjacent division unit candidates (step B16), and returns to step B12 to resume the process.

Effects of the First Exemplary Embodiment

The effects of this exemplary embodiment will be described below.

The first exemplary embodiment is configured such that it sequentially applies division rules, each of which has been classified into one of the multiple levels according to the degree of risk of causing analysis accuracy problems, and adjusts each division point such that the length of each resultant division unit is not too small but not greater than the maximum input length. Therefore, in cases where a maximum input length acceptable in an analysis process is set, it is possible to divide a long sentence into processing units of an appropriate length according to such maximum length of input.

Furthermore, this exemplary embodiment is configured such that it establishes a broad classification rule in which each division rule is associated with a level defined according to the risk of causing analysis accuracy problems, and thereby it adjusts each division point such that the length of each resultant division unit is not too small but not greater than the maximum input length. Therefore, in this exemplary embodiment, a division rule can be created relatively easily, because it is not necessary to add to its classification rule any strict priority information, for example, the lower limit of the number of words to which the division rule is to be applied.

Second Exemplary Embodiment

A second exemplary embodiment of the present invention will now be described in detail with reference to the drawings.

Figure 4:
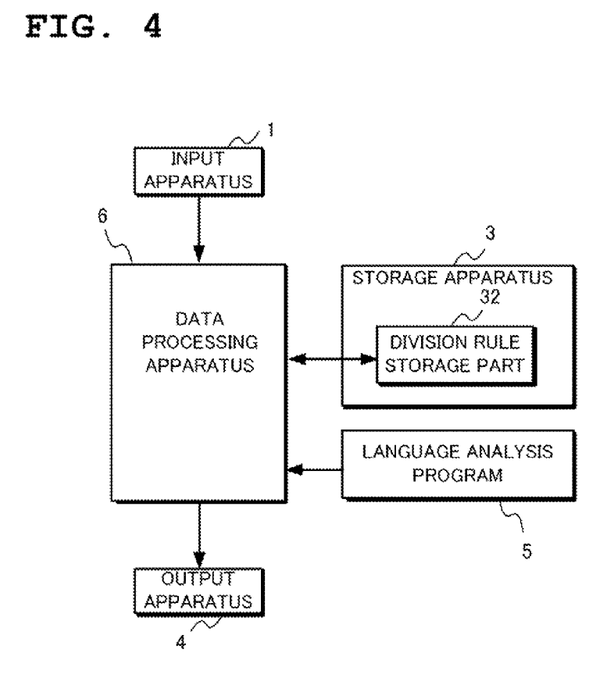
FIG. 4 is a block diagram showing the structure of a language analysis apparatus according to a second exemplary embodiment of the present invention.

With reference to FIG. 4, the second exemplary embodiment of the present invention comprises an input apparatus 1, a data processing apparatus 6, a storage apparatus 3, and an output apparatus 4, similarly to the first exemplary embodiment of the present invention.

A language analysis program 5, after being read into the data processing apparatus 6, controls the operation of the data processing apparatus 6 and generates a division rule storage part 32 within the storage apparatus 3.

Under the control by the language analysis program 5, the data processing apparatus 6 also performs the same process as the one performed by the data processing apparatus 2 according to the first exemplary embodiment.

Figure 7:
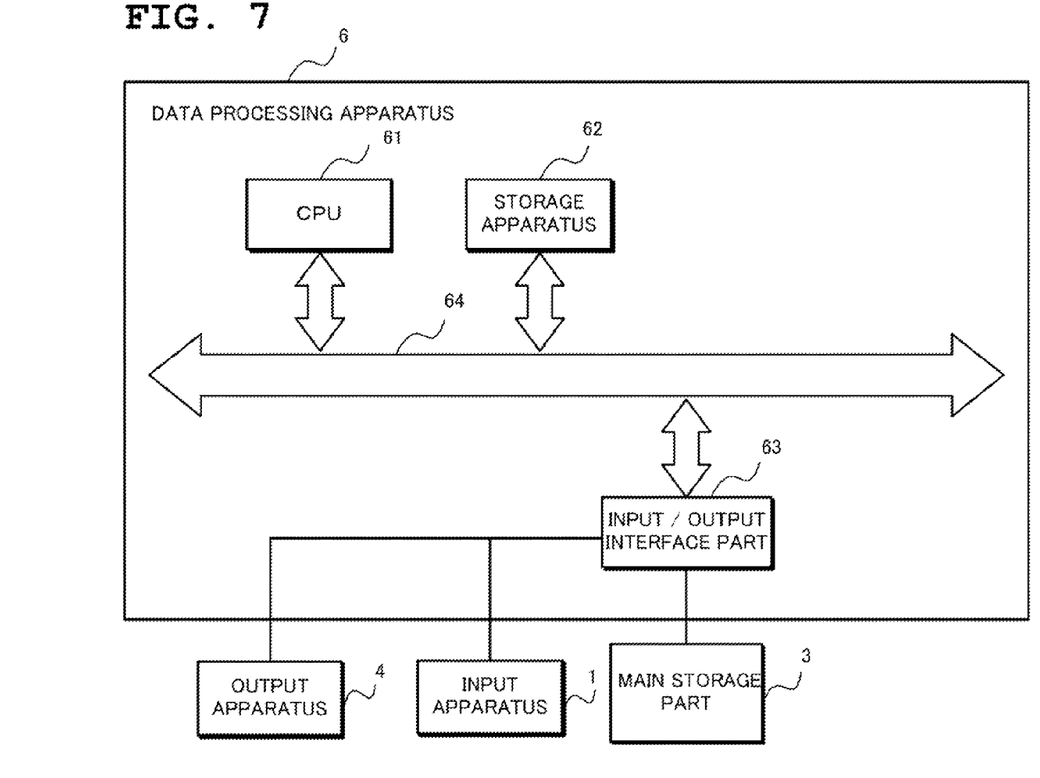
FIG. 7 is a block diagram showing the example hardware structure of the data processing device of the language analysis apparatus according to the first exemplary embodiment of the present invention.

The data processing apparatus 6 has a hardware structure as shown in FIG. 7.

As shown in FIG. 7, the data processing apparatus 6 can be realized in a hardware structure similar to a general computer apparatus, and comprises a CPU (Central Processing Unit) 61; a main storage part 62, which is a main memory such as a RAM (Random Access Memory) and which is used as a data work area and/or a temporary save area; an input/output interface part 63, which is connected with an input apparatus 1, an output apparatus 4, and a storage apparatus 3 to transmit and receive data; and a system bus 64, which connects between the above-described components. The storage apparatus 3 is realized by using, for example, a hard disc apparatus which comprises a nonvolatile memory, such as a ROM (Read Only Memory), a magnetic disc, and a semiconductor memory.

It goes without saying that the operation of the data processing apparatus 6 according to this exemplary embodiment can be realized as hardware by implementing a circuit component, which is a hardware component such as an LSI (Large Scale Integration) and which incorporates the above-described language analysis program 5. In addition, it can also be realized as software by storing the language analysis program 5 in the storage apparatus 3, loading the program into the main storage part 62, and executing the program on the CPU 61.

FIRST EXAMPLE

Example 1 of the present invention will now be described with reference to the drawings. This example corresponds to the first exemplary embodiment of the present invention.

Example 1 comprises a keyboard as the input apparatus 1, a personal computer as the data processing apparatus 2, a magnetic disc recording device as the storage apparatus 3, and a display as the output apparatus 4.

The personal computer has a CPU, which executes the functions of a division point candidate generation unit 21, a division point adjustment unit 22, and a division unit 23. In the magnetic disc recording device, a storage area which functions as a division rule storage part 31 is secured.

Figure 5:
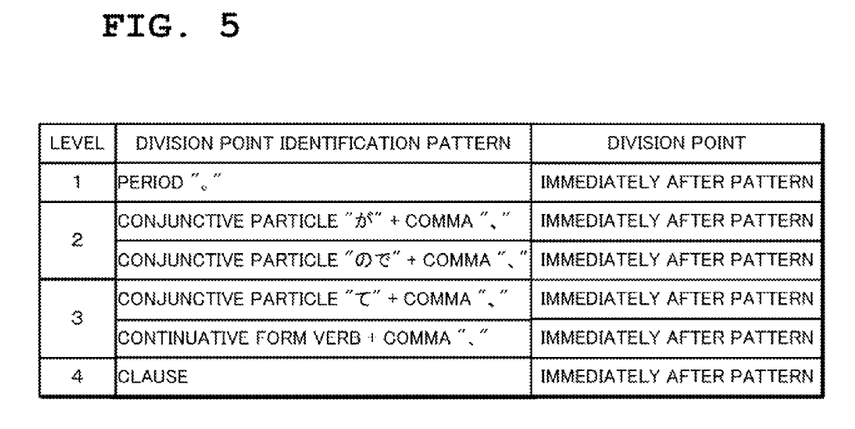
FIG. 5 is a diagram showing an example data structure in a division rule storage part according to the first exemplary embodiment of the present invention.

The description below assumes that division rules as shown in FIG. 5 are stored in the division rule storage part 31. FIG. 5 shows division rules stored in the division rule storage part 31 in schematic tabular form. Each row contains a division rule.

In FIG. 5, the first column "Level" stores the level information, which indicates the degree of risk that analysis accuracy problems will be caused by applying the corresponding division rule. The next column "Division Point Identification Pattern" stores the pattern information, based on which a division point should be identified. The final column "division point" stores information which indicates a position to be identified as a division point, as a relative position to the division point identification pattern.

For example, the first row of FIG. 5 contains a division rule of "Level 1," whose application will involve the lowest risk of causing analysis accuracy problems. For the division rule of "Level 1," it is indicated that if the input character string contains a full stop "o" as a division point identification pattern, the position immediately after the full stop ("pattern") can be identified as a division point.

The second row of FIG. 5 contains a division rule of "Level 2," whose application will involve a relatively low risk of causing analysis accuracy problems. For the division rule of "Level 2," it is indicated that if the input character string contains a division point identification pattern in which a conjunctive particle "が" and a comma "," appear in this order, the position immediately after the pattern can be identified as a division point. Similarly, in the third and forth rows in the table of FIG. 5, division rules of Levels 3 and 4 are described. Among the levels for division rules, Level 1 is the highest, followed by Levels 2, 3 and 4.

The description below assumes that the maximum input length has been set at "100." Here, an example operation will be described where a character string (Japanese sentence) with a length of 300, "~~~する。~~~するので、~~し、~~し、さらに~~する。", is input and where the division rules shown in FIG. 5 are used.

Figure 6:
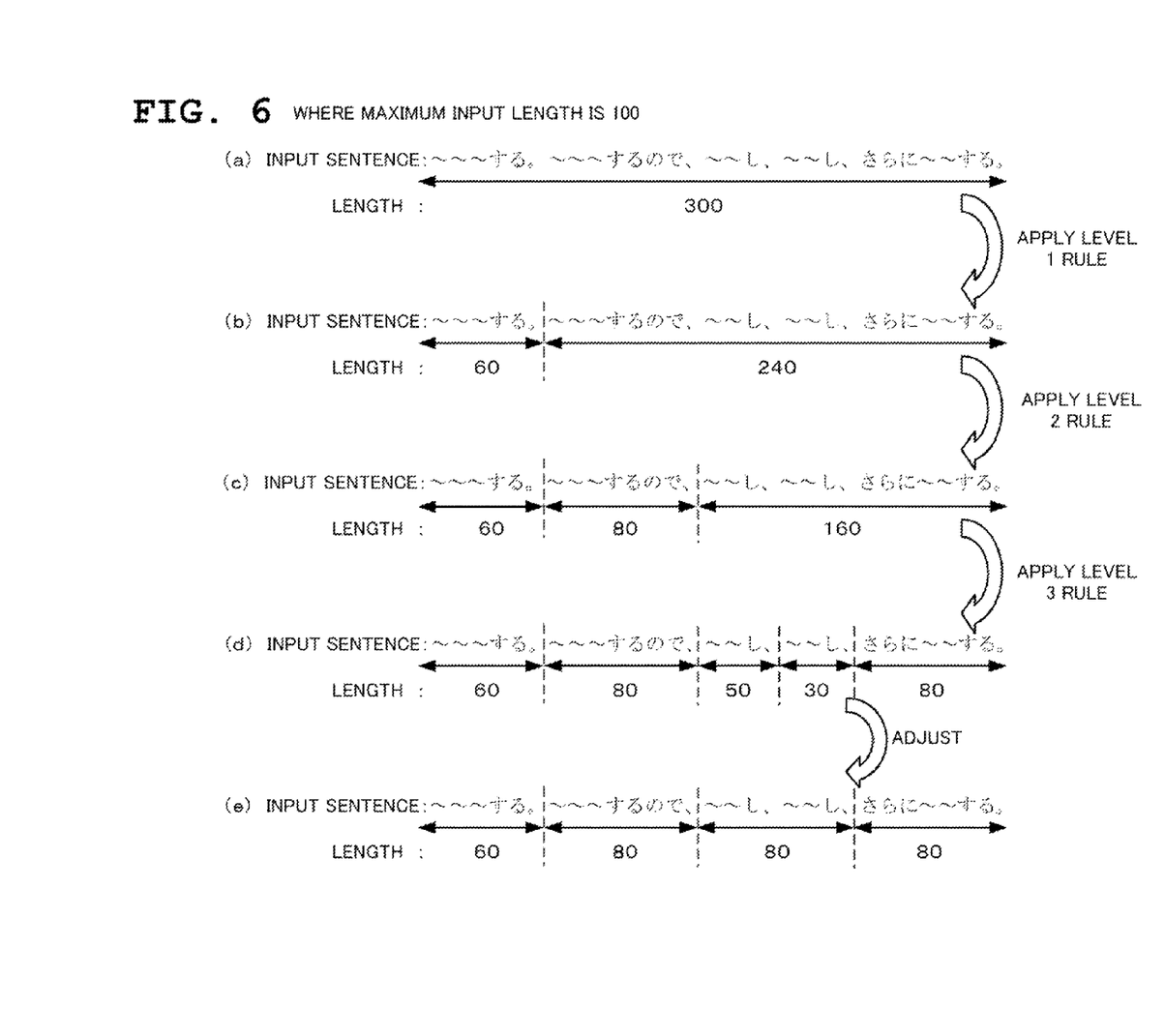
FIG. 6 is a diagram showing an example operation according to Example 1, which corresponds to the first exemplary embodiment of the present invention.

When an input sentence as shown in (a) in FIG. 6 is input via the keyboard or the like, i.e. the input apparatus 1 to the personal computer as the data processing apparatus 2, the division point candidate generation unit 21 accepts the input sentence and calculates its length. Based on the result, the division point candidate generation unit 21 detects that the length of the input sentence is "300," i.e. it is greater than the maximum input length "100," and sets the input sentence as the target of division. The division point candidate generation unit 21 also initializes the division rule level and sets it to the highest "Level 1" and performs a division point generation process.

During the division point generation process, the division point candidate generation unit 21 first obtains the "Level 1" division rule from the division rule storage part 31 and applies it to the target of division, i.e. the entire input sentence as shown in FIG. 6a). The division point candidate generation unit 21 then detects a period "。" within the target of division, so sets the subsequent part as a division point candidate.

Next, the division point adjustment unit 22 receives the division point candidate set by the division point candidate generation unit 21, and divides the target-of-division input sentence into division unit candidates. The result is as shown in FIG. 6b).

The division point adjustment unit 22 then selects one division unit candidate yet to be processed from within the target of division. As the method of selecting a yet-to-be-checked division unit candidate used herein, the one to begin the selection with the one nearest to the head of the division unit candidate among all the division unit candidates, and move on sequentially, will be adopted herein.

First of all, the first division unit candidate with a length of "60," i.e. "~~~する。" shown in FIG. 6 is selected. The division point adjustment unit 22 then calculates the length of the division unit candidate, and determines that its length "60" is less than the maximum input length "100."

The division point adjustment unit 22 then obtains from within the target of division a division unit candidate "~~~するので、~~し、~~し、さらに~~する。", which is adjacent to the currently-selected division unit candidate "~~~する。".

Since a sum of these two lengths is "300," the division point adjustment unit 22 establishes the currently-selected division unit candidate "~~~する。" as "checked," and selects the next yet-to-be-processed division unit candidate "~~~するので、~~し、~~し、さらに~~する。" as the new target of processing.

The length of this division unit candidate is "240," which is greater than the maximum input length "100." The division point adjustment unit 22, therefore, sets this division unit candidate as the target of division, lowers the division rule level by one to "Level 2," and invokes the division point generation process recursively.

Similarly to the above, the division point candidate generation unit 21 obtains the division rule of "Level 2" shown in FIG. 5 from the division rule storage part 31, and applies it to the target of division, i.e. the second division unit candidate shown in FIG. 6b).

The division point candidate generation unit 21 detects the pattern in which a conjunctive particle "ので" and a comma "、" appear consecutively in this order within the target of division, so sets the subsequent part as a division point candidate. The result is as shown in FIG. 6c).

In the same manner as the above, the division point adjustment unit 22 establishes as "processed" the division unit candidate "~~~するので、" ("80" in length), whose length is less than the maximum input length. The division point adjustment unit 22 then sets as the target of division the division unit candidate "~~し、~~し、さらに~~する。" ("160" in length), whose length is greater than the maximum input length, lowers the division rule level by one to "Level 3," and invokes the division point generation process recursively.

Similarly to the above, the division point candidate generation unit 21 obtains the division rule of "Level 3" from the division rule storage part 31, and applies it to the target of division, i.e. the third division unit candidate shown in FIG. 6c). The division point candidate generation unit 21 detects, at two locations, the pattern in which a continuative form verb "し" and a comma "、" appear consecutively in this order within the target of division, so sets their respective subsequent parts as division point candidates. The result is as shown in FIG. 6d).

The division point adjustment unit 22 selects the first division unit candidate "~~し、" ("50" in length") as a yet-to-be-processed division unit candidate, and determines that its length "50" is less than the maximum input length "100."

The division point adjustment unit 22 then obtains from within the target of division the second division unit candidate "~~し、", which is adjacent to the first division unit candidate "~~し、".

The division point adjustment unit 22 further calculates a sum of the length of these two division unit candidate, and determines that the sum of the lengths "80" is less than the maximum input length "100."

The division point adjustment unit 22 removes the division point candidate located between these two division unit candidates, and sets as the new target of processing the division unit candidate "~~し、~~し、" ("80" in length), which has been obtained by joining these above-mentioned two division unit candidates. The result is as shown in FIG. 6e).

The division point adjustment unit 22 selects the next adjacent division unit candidate "さらに~~する。" ("80" in length). This time, a sum of the division unit candidates to be processed is "160" and exceeds the maximum input length "100." Accordingly, it establishes the division unit candidate "~~し、~~し、" ("80" in length) as "processed" and selects the next yet-to-be-processed division unit candidate "さらに~~する。" ("80" in length) as the new target of processing.

Since this division unit candidate is smaller in length than the maximum input length "100" and there exists no adjacent division unit candidate that is yet to be processed, the division point adjustment unit 22 establishes the obtained division point candidate as the final selection and generates the division point.

The division point adjustment unit 22 recursively returns the process to find that there exists no division unit candidate yet to be processed. Therefore, it establishes all the obtained division point candidates one by one and generates the corresponding division points.

Finally, the division unit 23 used the obtained division point to divide the input sentence and outputs the resultant four division units: "~~~する。", "~~~するので,", "~~し, ~~し,", and "さらに~~する。".

While the present invention has been described by taking preferred exemplary embodiments and examples, it should be appreciated that the invention is not limited to such exemplary embodiments and examples but can be embodied with a variety of modifications without departing from the spirit and scope of its technical principle.

INCORPORATION BY REFERENCE

This application is based upon and claims the benefit of priority from Japanese patent application No. 2009-081431, filed on Mar. 30, 2009, the disclosure of which is incorporated herein in its entirety by reference.

INDUSTRIAL APPLICABILITY

A language analysis apparatus according to the present invention can be applied to various applications, including a parsing apparatus which parses a document described in a first language to output the syntax of each sentence, and a machine translation apparatus which translates a document described in a first language (a certain language) into a second language (another language).

What is claimed is:

1. A language analysis apparatus, comprising:
division rules, each of which is classified into one of levels according to a degree of risk of causing analysis accuracy problems when applied;
a division point candidate generation unit which, when a character string whose length is greater than a predetermined maximum input length is input, generates division point candidates for the input character string by applying said division rules sequentially one by one in an ascending order of the level of risk of causing problems;
a division point adjustment unit which, when the length of a division unit candidate obtained by dividing said character string at a division point candidate generated by the division point candidate generation unit is less than predetermined said maximum input length, selects a combination of division points from among the division point candidates obtained by applying division rules of the same level while ensuring that each division unit is not greater in length than said maximum input length; and
a division unit which divides an input character string at a division point determined by said division point adjustment unit.

2. The language analysis apparatus of claim 1, wherein when said division point adjustment unit determines that the length of said division unit candidate is greater than said maximum input length, said division point candidate generation unit generates a new division point candidate for said division unit candidate by applying a division rules of a level lower than the previous division rules.

3. The language analysis apparatus of claim 1, wherein said division point adjustment unit calculates a sum of the length of two adjacent division unit candidates beginning with the division unit candidates at the head and, when said sum of the lengths is not greater than said maximum input length, does not select as a division point the division point candidate located between these adjacent division point candidates.

4. The language analysis apparatus of claim 1, wherein said division point adjustment unit calculates a sum of the length of two adjacent division unit candidates beginning with the division unit candidates at the end and, when said sum of the lengths is not greater than said maximum input length, does not select as a division point the division point candidate located between these adjacent division point candidates.

5. The language analysis apparatus of claim 1, wherein said division point adjustment unit calculates a sum of the length of two adjacent division unit candidates beginning with the division unit candidates with the smallest lengths and, when said sum of the lengths is not greater than said maximum input length, does not select as a division point the division point candidate located between these adjacent division point candidates.

6. A language analysis method, comprising:
a division point candidate generation step, performed by a processor, of, when a character string whose length is greater than a predetermined maximum input length is input, generating division point candidates for the input character string by applying division rules, each of which has been classified into a level according to a degree of risk of causing analysis accuracy problems when applied, sequentially one by one in an ascending order of the level of risk of causing problems;
a division point adjustment step, performed by the processor, of, when the length of a division unit candidate obtained by dividing said character string at a division point candidate generated in the division point candidate generation step is less than said maximum input length, selecting a combination of division points from among the division point candidates obtained by applying division rules of the same level while ensuring that each division unit is not greater in length than said maximum input length; and
a division step, performed by the processor, of dividing an input character string at a division point determined by said division point adjustment step.

7. The language analysis method of claim 6, wherein when said division point adjustment step determines that the length of said division unit candidate is greater than said maximum input length, said division point candidate generation step generates a new division point candidate for said division unit candidate by applying a division rules of a level lower than the previous division rules.

8. The language analysis method of claim 6, wherein said division point adjustment step calculates a sum of the length of two adjacent division unit candidates beginning with the division unit candidates at the head and, when said sum of the lengths is not greater than said maximum input length, does not select as a division point the division point candidate located between these adjacent division point candidates.

9. The language analysis method of claim 6, wherein said division point adjustment step calculates a sum of the length of two adjacent division unit candidates beginning with the division unit candidates at the end and, when said sum of the lengths is not greater than said maximum input length, does not select as a division point the division point candidate located between these adjacent division point candidates.

10. The language analysis method of claim 6, wherein said division point adjustment step calculates a sum of the length of two adjacent division unit candidates beginning with the division unit candidates with the smallest lengths and, when said sum of the lengths is not greater than said maximum input length, does not select as a division point the division point candidate located between these adjacent division point candidates.

11. A non-transitory computer-readable medium storing a language analysis program which performs a language analysis process by running on a computer, wherein said language analysis program causing a computer to perform a division point candidate generation process which, when a character string whose length is greater than a predetermined maximum input length is input, generates division point candidates for the input character string by applying division rules, each of which has been classified into a level according to a degree of risk of causing analysis accuracy problems when applied, sequentially one by one in an ascending order of the level of risk of causing problems;

a division point adjustment process which, when the length of a division unit candidate obtained by dividing said character string at a division point candidate generated by the division point candidate generation process is less than said predetermined maximum input length, selects a combination of division points from among the division point candidates obtained by applying division rules of the same level while ensuring that each division unit is not greater in length than said maximum input length; and a division process which divides an input character string at a division point among said selected division points determined by said division point adjustment process.

12. The non-transitory computer-readable medium of claim 11, wherein when said division point adjustment process determines that the length of said division unit candidate is greater than said maximum input length, said division point candidate generation process generates a new division point candidate for said division unit candidate by applying a division rules of a level lower than the previous division rules.

13. The non-transitory computer-readable medium of claim 11, wherein said division point adjustment process calculates a sum of the length of two adjacent division unit candidates beginning with the division unit candidates at the head and, when said sum of the lengths is not greater than said maximum input length, does not select as a division point the division point candidate located between these adjacent division point candidates.

14. The non-transitory computer-readable medium of claim 11, wherein said division point adjustment process calculates a sum of the length of two adjacent division unit candidates beginning with the division unit candidates at the end and, when said sum of the lengths is not greater than said maximum input length, does not select as a division point the division point candidate located between these adjacent division point candidates.

15. The non-transitory computer-readable medium of claim 11, wherein said division point adjustment process calculates a sum of the length of two adjacent division unit candidates beginning with the division unit candidates with the smallest lengths and, when said sum of the lengths is not greater than said maximum input length, does not select as a division point the division point candidate located between these adjacent division point candidates.

* * * * *